United States Patent [19]

Okubo et al.

[11] Patent Number: 4,709,512
[45] Date of Patent: Dec. 1, 1987

[54] CHUCKING DEVICE OF WORKPIECE IN GRINDING MACHINE

[75] Inventors: Kimio Okubo, Yuki; Hiroshi Nemoto, Tama, both of Japan

[73] Assignee: Fujitsu Limited, Kawasaki, Japan

[21] Appl. No.: 807,950

[22] Filed: Dec. 12, 1985

[30] Foreign Application Priority Data

Dec. 18, 1984 [JP] Japan ................. 59-266851

[51] Int. Cl.$^4$ .............................. B25B 5/00
[52] U.S. Cl. ................. 51/237 R; 51/217 T; 279/1 C
[58] Field of Search ............... 51/217 T, 237 R, 236, 51/237 CS; 82/63; 279/1 C, 106, 35

[56] References Cited

U.S. PATENT DOCUMENTS 2,046,238 6/1936 Balsiger ................. 51/237 R
3,975,029 8/1976 Benjamin ................. 279/106 X

FOREIGN PATENT DOCUMENTS

56-139811 10/1981 Japan .
59-19614 2/1984 Japan .
59-107809 6/1984 Japan .

Primary Examiner—Frederick R. Schmidt
Assistant Examiner—Debra S. Meislin
Attorney, Agent, or Firm—Staas & Halsey

[57] ABSTRACT

A chucking device of a workpiece to be ground in a grinding machine, including a rotatable housing, a pair of elastically biased weight bodies which are opposed in the housing so as to come away from and close to each other a pair of opposed clamp plates which are provided on the respective weight bodies for relative movement and which have openings defining a center insertion opening in which the workpiece is inserted, and an end plate which is secured to the housing for covering the housing. The clamp plates are capable of inclining in planes thereof. The workpiece is firmly held in and by the center insertion opening of the clamp plates at at least four points of the center insertion hole by the outward displacement of the weight bodies, due to the centrifugal force acting thereon when the chucking device rotates.

15 Claims, 11 Drawing Figures

CHUCKING DEVICE OF WORKPIECE IN GRINDING MACHINE

BACKGROUND OF THE INVENTION

1. Field of the Invention

The present invention relates to a chucking device of a workpiece to be ground in a grinding machine which requires an extremely high precision of grinding.

The present invention can be used, for example, to chuck a ferrule which is used as an optical connector. The ferrule can be used to optically connect opposed optical fibers which are inserted in an axial bore of the ferrule and which butt against each other. Generally, the axial bore of the ferrule is approximately in the order of 0.1 mm of diameter, so that the optical fibers can be closely fitted in the axial bore. The ferrule can be made of a metal sleeve or the like.

Such a small ferrule must be ground and finished with a high precision, so that the outer periphery of the ferrule is coaxial to the small axial bore thereof. Usually, the tolerance of the outer diameter of the ferrule per se is on the order of approximately 1 $\mu$m or less, the coaxial coincidence between the outer diameter and the axial bore of the ferrule requires the same extent of precision. The ferrule, a small workpiece, usually is about 2 to 4 mm in outer diameter and about 10 mm in length. Accordingly, it is necessary to use a special chucking device which can hold a very narrow area or short length of the ferrule to chuck the same.

In addition, in order to automate the grinding operation, including the chucking operation, it is necessary to release the chuck when the grinding operation is at rest and to self-clamp the ferrule in the course of the grinding operation.

2. Description of the Related Art

In a known chucking device, for example, disclosed in Japanese Unexamined Patent Publication (Kokai) No. 59-107809 which is considered closest to the present invention among those the applicant is aware of, the workpiece to be ground, such as a ferrule, can be held by a pair of clamp plates which have elongated openings with circular arcs and which can be moved away from and close to each other to enlarge or reduce the substantially eye-shaped or oval opening defined by the circular arcs of the opposed elongated openings of the clamp plates in order to release and hold the ferrule inserted in the circular opening. Since the ferrule is chucked, however, substantially at diametrically opposed two points (exactly speaking, two lines) of the inner periphery of the eye-shaped opening by a frictional force, sufficient chucking of the ferrule cannot be achieved, resulting in an instable clamping of the ferrule. In addition to the instability, if the axial bore of the ferrule is not coaxial to the outer periphery of the ferrule, that is, if the ferrule has an eccentric axial bore, the ferrule which is held between and by sharp ends of opposed centers of a grinder is eccentric to or deviated from the center axis connecting the opposed centers.

The eccentricity results in a bending force acting on the ferrule or an unbalanced clamp of the ferrule, resulting in a bad influence on the precision of grinding.

The primary object of the present invention is, therefore, to eliminate the aforementioned drawbacks of the prior art.

SUMMARY OF THE INVENTION

In order to achieve the object mentioned above, according to the present invention, there is provided a chucking device of a workpiece to be ground in a grinding machine, including a hollow housing which can be rotatably connected to the grinding machine, a pair of weight bodies which are opposed in the housing so as to move away from and close to each other along the guide means of the housing, a pair of opposed clamp plates which are provided on the respective weight bodies for relative movement and which have openings defining a center insertion opening in which the workpiece is inserted, the clamp plates being capable of inclining in planes thereof, and an end plate which is secured to the housing for covering the housing in which the weight bodies and the clamp plates are accommodated, the workpiece being firmly held in and by the center insertion opening of the clamp plates of at least four points of the center insertion hole by the outward displacement of the weight bodies, due to the centrifugal force acting thereon when the chucking device rotates.

BRIEF DESCRIPTION OF THE DRAWINGS

FIGS. 1 to 3 show the prior art, of which

FIGS. 4 to 7 show an embodiment of the present invention, in which

DESCRIPTION OF THE PREFERRED EMBODIMENTS

Figure 1:
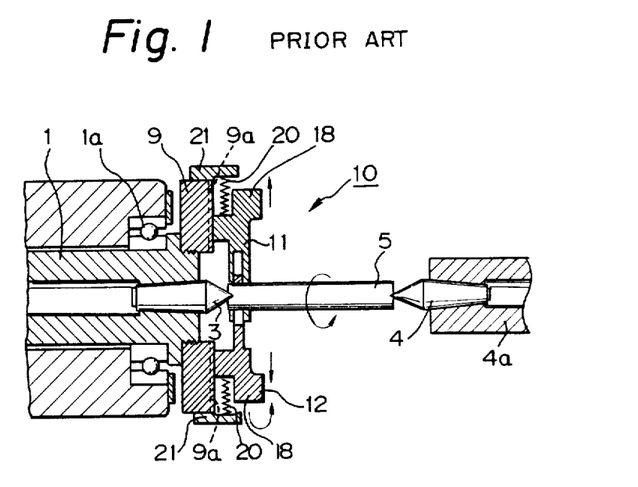
FIG. 1 is a longitudinal sectional view of a main part of a chucking device of the prior art.
Figure 2:
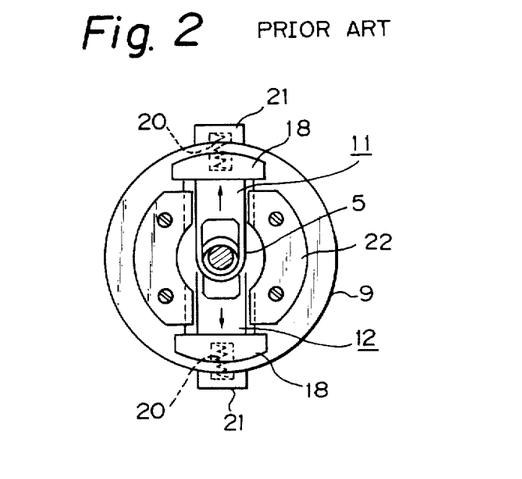
FIG. 2 is a front elevational view of FIG. 1.
Figure 3:
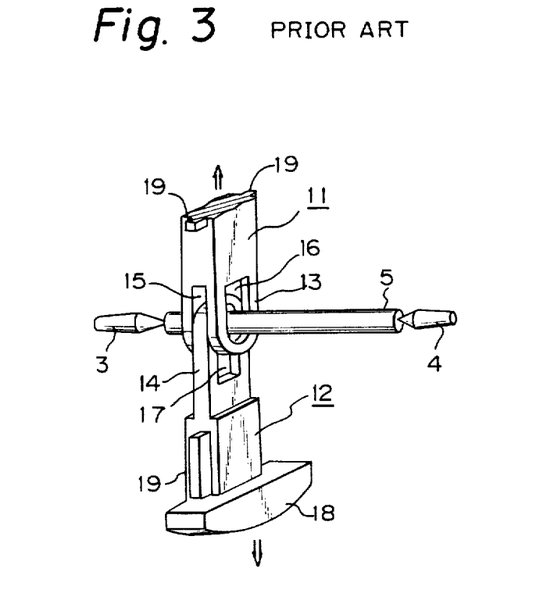
FIG. 3 is a perspective view of a main part of a chucking device shown in FIGS. 1 and 2.

With first reference to FIGS. 1 to 3, which show one example of a chucking device of a cylindrical grinder according to the prior art, disclosed in Japanese Unexamined Patent Publication (Kokai) No. 59-107809, an annular circular surface plate 9 is screwed onto one end of a spindle 1 of the cylindrical grinder adjacent to a bearing 1a. The surface plate 9 is provided, on its one end face, with diametrically opposed guide channels 9a extending perpendicular to the axis of the spindle 1 to slidably guide a pair of holders 11 and 12 therein. The holders 11 and 12 have at their respective front ends 13 and 14 elongated holes 16 and 17, respectively, which can occupy a clamping position in which the elongated holes 16 and 17 form a circular hole coaxial to the spindle 1. The holders 11 and 12 are held by a pair of archwise keep plates 22 which are secured to the surface plate 9 to prevent the holders from coming out of the corresponding guide channels 9a. The holders are continuously biased toward each other by springs 20 which are held between weights 18 integral with the respective holders 11 and 12, and spring keep plates 21 secured to the surface plate 9.

The front end 13 of the holder 11 is bifurcated to provide a recessed groove 15 in which the front end 14 of the holder 12 is slidably inserted, so that the elongated holes 16 and 17 form the circular hole for inserting the workpiece, i.e., the ferrule 5, as mentioned before.

The workpiece 5 is held coaxially to the spindle by means of centers 3 and 4 on the sides of the spindle 1 and a pusher 4a, respectively.

When the spindle rotates, the weights 18 of the holders 11 and 12 move outward far from each other due to the centrifugal force caused by the rotation of the holders together with the spindle 1, against the springs 20. The outward movement of the holders 11 and 12 decreases the diameter of the center circular hole defined by the elongated holes 16 and 17, so that the ferrule 5 can be firmly held in the center circular hole.

In this arrangement, the holders 11 and 12 can move only in the radial direction of the surface plate 9 so that the center circular hole formed by the elongated holes 16 and 17 reduces or enlarges in a homologous manner. Since the center circular hole is larger than the diameter of the ferrule to be chucked for the purpose of easy insertion of the ferrule therein, as can be seen from FIG. 2, the ferrule 5 can be held only at two diametrically opposed points of the center circular hole, resulting in an insufficient clamping of the ferrule by the holders. The insufficient clamping of the ferrule may cause an accidental movement of the ferrule in the course of a grinding operation.

In addition to the foregoing, if the centrifugal force is not uniformly or symmetrically exerted on the diametrically opposed weights 18 and accordingly on the holders 11 and 12, the ferrule held by the holders can be deviated from or can become eccentric from the center of the centers 3 and 4, resulting in a decreased precision of grinding finishing.

The above mentioned drawbacks can be eliminated by the present invention.

Preferred embodiments of the present invention will be described below with reference to FIGS. 4 to 11.

FIGS. 4 to 7 show a first embodiment of the invention. The chucking device of the present invention fundamentally includes a housing 51 having a cylindrical body 52 with a bottom plate 53. The cylindrical body 52 is provided on its lower peripheral portion with peripheral threads 54. On an upper end face of the cylindrical body 52 are formed threaded holes 55 and positioning holes 56.

Two pin holes 57 are formed on the peripheral wall of the cylindrical body 52 and are diametrically opposed to each other. In the pin holes 57 are press fitted corresponding pins 58 which project inward from the inner periphery of the cylindrical body 52.

The bottom plate 53 is provided with a center hole 59 and two rectangular openings 60 which are diametrically opposed to each other on the opposite sides of the center hole 59. The line connecting the axes of the rectangular openings 60 is normal to the line connecting the axes of the pin holes 57.

In the rectangular openings 60 are inserted key members 62 which have a corresponding shape and which have flanges 61 which are received in recesses 60a provided on the lower end surface of the bottom plate 53. The flanges 61 are secured to the bottom plate 53 by means of set screws 63, so that upper ends of the key members 62 project inward or upward into the cylindrical body 52.

The chucking device of the invention also includes a pair of weight bodies 71 which are substantially of semicircular shape. The weight bodies 71 are made by dividing a cylinder or disc plate into two bodies by a center separating space with a predetermined width. The weight bodies 71 have opposed vertical end faces 72 spaced from one another. On the upper horizontal surfaces 73 of the weight bodies 71 are formed center recessed grooves 74 which extend perpendicular to the end faces 72. Each of the recessed grooves 74 is provided, on its opposite sides, with projections 75. Each of the weight bodies 71 has a stepped blind hole consisting of an entrance hole 76 and an inner hole 77 of smaller diameter connected to the entrance hole 76. The blind holes of the weight bodies extend along the length of the recessed grooves 74, i.e. perpendicular to the end faces 72, and are diametrically opposed to each other. Rectangular vertical holes 78 are formed in the center portions of the recessed grooves 74 to open into the respective smaller holes 77. The end faces 72 are provided, on their center portions, with recesses 79 which have a width slightly larger than the width of the recessed grooves 74.

On the bottom surfaces 80 of the weight bodies 71 are provided key ways 81 which extend in the direction of the length of the recessed grooves 74 and in which the corresponding key members 62 are fitted for relative sliding movement. Preferably, projecting ridges 82 located on the opposite sides of the key ways 81 and additional ridges 83 are provided on the bottom surfaces of the weight bodies 71 to decrease the contact surface area between the bottom surfaces of the weight bodies and the upper surface of the bottom plate 53, thereby to ensure an easy sliding of the weight bodies 71 relative to the bottom plate 53 of the housing 51. The relative slide of the weight bodies 71 will be discussed hereinafter in detail. The ridges 82 and 83 extend in the direction of the axes of the holes 76 and 77.

A pair of clamp plate supports 85 are made of body plates 86 having a width substantially equal to the width of the corresponding recessed grooves 74 of the weight bodies 71 so as to slide therein. The supports 86 have recessed grooves 87 and threaded holes 88 on the center lines of the corresponding recessed grooves 87, projecting tongues 89 on the bottom surfaces of the supports 85, and projecting abutments 90 on the opposed inner end faces of the opposed supports 85. On the outer end faces of the supports 85 are provided stop plates 91 which are secured thereto by means of set screws 92.

In the recessed grooves 87 of one of the supports 85 are located two identical spacer plates 93 of small thickness and an intermediate clamp plate 94a between the spacer plates 93, whereas two clamp plates 94b and 94c and an intermediate spacer plate 93 of small thickness between the two clamp plates 94b and 94c are located in the recessed grooves 87 of the other support 85. The clamp plate assemblies, consisting of (1) two spacer plates and one clamp plate and (2) two clamp plates and one spacer plate, are attached to the respective supports 85 by means of stepped screws 96, which are screwed in threaded holes 88 in the recessed grooves 87 through through holes 95 provided in the spacer plates 93 and the clamp plates 94a, 94b, and 94c, respectively.

The three identical clamp plates 94a,b,c have a width slightly smaller than the width of the recessed grooves 87 so as to slightly move in the corresponding recessed grooves 87, as will be described below. The three identical spacer plates 93 have a thickness identical to that of the clamp plates 94.

The stepped screws 96 have intermediate shaft portions 96a in which the clamp plate assemblies are engaged, so that the clamp plates 94a, 94b, and 94c can slightly rotate in the corresponding recessed grooves 87 about the corresponding screws 96, resulting in a slight swing movement of the ends of the clamp plates far from the screws 96 about the latter.

The clamp plates 94a, 94b, and 94c are identical to each other. The plate 94a is located in a symmetric arrangement to the latter two clamp plates with respect to the axis of the centers 123 and 124.

The clamp plates 94a, 94b, and 94c have substantially pentagonal openings 98 aligned on the axis of the centers 123 and 124, when the clamp plates are located one on another.

Each of the pentagonal openings 98 is generally a combination of a rectangle and a triangle having a V-shaped apex 97 of an acute angle. The clamp plates can be made by a strong and tough material, such as spring steel plate or the like preferably reinforced or hardened, for example, by quenching, and polished and finished.

The clamp plates can be made at one time, for example, by pressing or punching, and the pentagonal openings can be easily made, for example, by electric discharging machining. A disc-shaped front end plate 101 is provided, on its rear face, with a circumferential flange 102 in which the cylindrical body 52 of the housing 51 can be fitted to cover or close the housing 51. The front end plate 101 has a central hole 103 and two elongated holes 104 which are diametrically opposed on the opposite sides of the center hole 103.

The heads of the screws 96 are received in the corresponding elongated holes 104. Along the diameter connecting the elongated axes of the elongated holes 104, a stepped recess consisting of an outer recess 105 and an inner recess 106 are provided on the rear surface of the end plate 101, so that the clamp plate assemblies including the clamp plate supports 85, the clamp plates 94 (94a, 94b, 94c), and the spacer plates 93 and the projections 75 of the weight bodies 71 are fitted to prevent accidental displacement of the clamp plate assemblies and the weight bodies. On the opposite sides of the elongated holes 104 in the end plate 101 are provided for example two pin holes 107 in which positioning pins 109 are press-fitted to be press-fitted also in the corresponding pin holes 56 of the cylindrical body 52 of the housing 51.

The end plate 101 is also provided on its periphery with, for example, six countersinks 108 in which corresponding flush bolts 110 are inserted to be screwed in the corresponding threaded holes 55 of the housing 51, so that the end plate 101 can be secured to the housing 51.

Between the bottoms of the holes 77 of the weight bodies 71 and the corresponding tongue plates 89 of the supports 85 are arranged compression springs 115. On the shoulders defined between and by the stepped holes 76 and 77 are located disc plates 116 against which another compression springs 117 bear in the corresponding holes 76. The other ends of the second springs 117 bear against the inner peripheral wall of the cylindrical body 52 of the housing 51.

Figure 4:
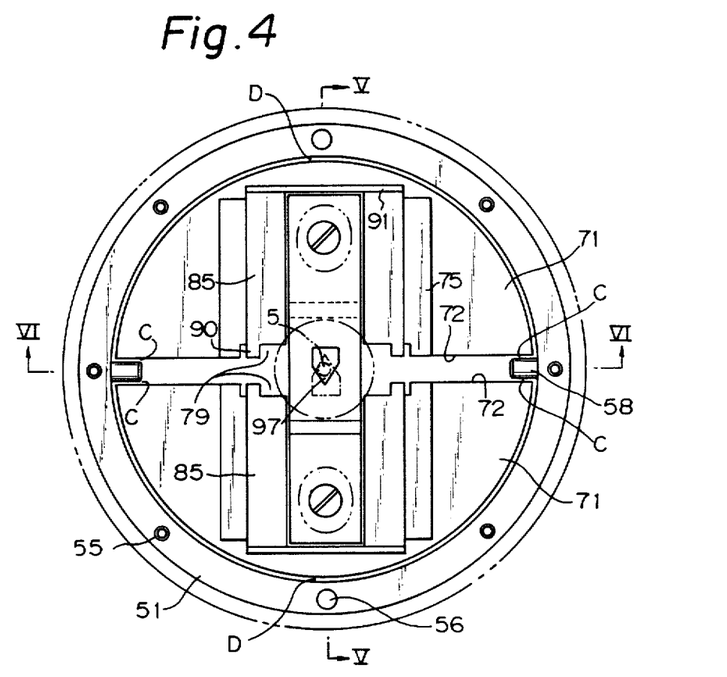
FIG. 4 is a front elevational view of a chucking device with removed front end plate.
Figure 5:
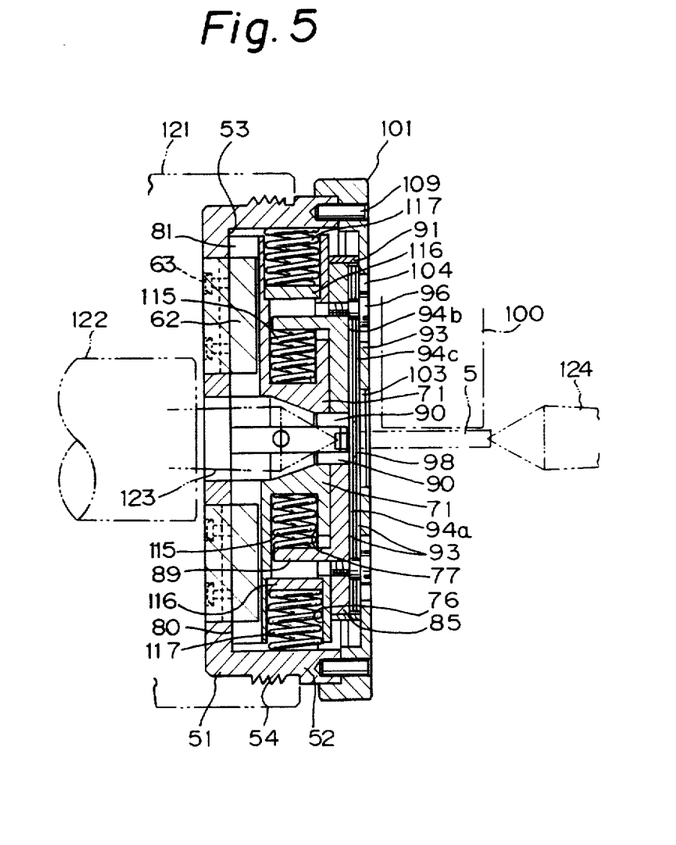
FIG. 5 is a sectional view taken along the line V—V in FIG. 4.
Figure 6:
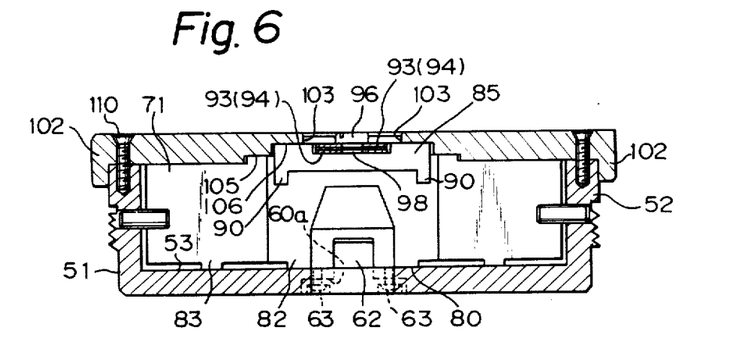
FIG. 6 is a sectional view taken along the line VI—VI in FIG. 4.

The chucking device of the present invention is incorporated in the grinding machine in such a way that the outer peripheral threaded portion 54 of the housing 51 is screwed in the corresponding inner threaded portion of the rotary spindle 122 of the grinding machine. The front end of a stationary center (nonrotatable center) 123 projecting from a stationary spindle 122 is located in the vicinity of the clamp plates 94. The first springs 115 are properly compressed and bias the clamp plate supports 85 in the radial and outward directions with respect to the weight bodies 71. The supports 85, however, cannot move radially and outwardly, since the abutment projections 90 come into contact with the recesses 79. In this state, the pentagonal openings 98 of the clamp plates 94 define an enlarged diamond-shaped opening when viewed from a front elevation, as shown in FIG. 4. The diamond-shaped opening is defined by a pair of opposed two side lines defining the apexes 97 of the triangles of the pentagonal openings 98 and can be reduced by an outward displacement of the clamp plates 94, as will be discussed hereinafter.

The second springs 117 are also properly compressed to bias the corresponding weight bodies 71 toward each other in the radial directions through the disc plates 116, with respect to the inner peripheral wall of the housing 51. The weight bodies, however, cannot move, because they bear against the pins 58 of the housing 51 on the opposite sides of the pins 58. In this state, the clearances C (FIG. 1) between the end surfaces 72 of the weight bodies 71 and the corresponding pins 58 is zero. The diamond-shaped opening is, in this state, as mentioned above, enlarged. Note that when the weight bodies 71 come into contact with the corresponding pins 58, the weight bodies are in a symmetrical arrangement with respect to the axis of the workpiece 5 (axes of the opposed centers 123 and 124), and accordingly, the diamond-shaped opening defined by the pentagonal openings 98 is coaxial to the axis mentioned above. It will be appreciated that the springs 117 are sufficient to raise corresponding one weight body 71 in the vertical direction so as to press the weight body against the corresponding pin 58.

The discussion will be directed below to an operational (rotational) position of the grinder from the aforementioned non-operational position thereof.

The workpiece (ferrule) 5 is inserted in the enlarged diamond-shaped opening of the clamp plates 94, so that the sharp front end of the stationary center 123 is fitted in the axial bore of the ferrule 5 at one end of the ferrule. After that, the other stationary center 124 is pushed in the horizontal direction toward the ferrule 5 by means of a pusher (not shown) while being kept in a horizontal state, so that the sharp end of the center 124 is fitted in the axial bore of the ferrule at the other end thereof. Thus, the ferrule 5 can be horizontally held by and between the two opposed centers 123 and 124. The center axis of the centers 123 and 124 is exactly coaxial to the center axis of the ferrule 5. The rotation of the rotary spindle 121 causes the entirety of the chucking device of the present invention to rotate in the same direction. As the number of revolutions of the spindle 121 increases, the centrifugal force acting on the weight bodies increases. It should be noted that the weight bodies cannot move in the rotational direction relative to the supports 85, i.e. the housing 51, due to the engagement of the key members 62 in the corresponding key ways 81 of the weight bodies. The increased centrifugal force prevails over the springs 117, so that the weight bodies move or slide in the outward and radial directions along the key members 62. The outward slide movement of the weight bodies 71 causes it to separate from the pins 58 and to come into contact, at the outer periphery 27 thereof, with the inner periphery of the housing 51. Further increases in the centrifugal force cannot cause further outward movement of the weight bodies 71, because of the abutment between the weight bodies and the housing. Namely, in this position, the clearances D (FIG. 4) between the housing 51 and the weight bodies 71 is zero.

On the other hand, looking at the movement of the clamp plate supports 85, the clamp plates 94 and the clamp plate supports 85 also move far from one another by the outward displacement of the weight bodies 71 through the springs 115 before the clearances D become zero. The outward displacement of the clamp plates and supports makes the diamond-shaped opening smaller, so that the ferrule 5 can be firmly held by and between the opposed side lines defining the acute apexes of the diamond-shape.

The clamp plates 94 stop moving in the outward and radial directions when the ferrule is firmly held in and by the reduced diamond-shaped opening. Further outward displacement of the weight bodies 71 continues even after the clamp plates stop moving until the weight bodies come into contact with the inner peripheral wall of the housing 51. The further displacement of the weight bodies 71 compresses the springs 115 between the holes 77 and the tongue plates 89.

The ferrule 5 which rotates while being held by the chucking device of the present invention can be ground by a grinding wheel 100 (FIG. 5), which also rotates.

Figure 7:
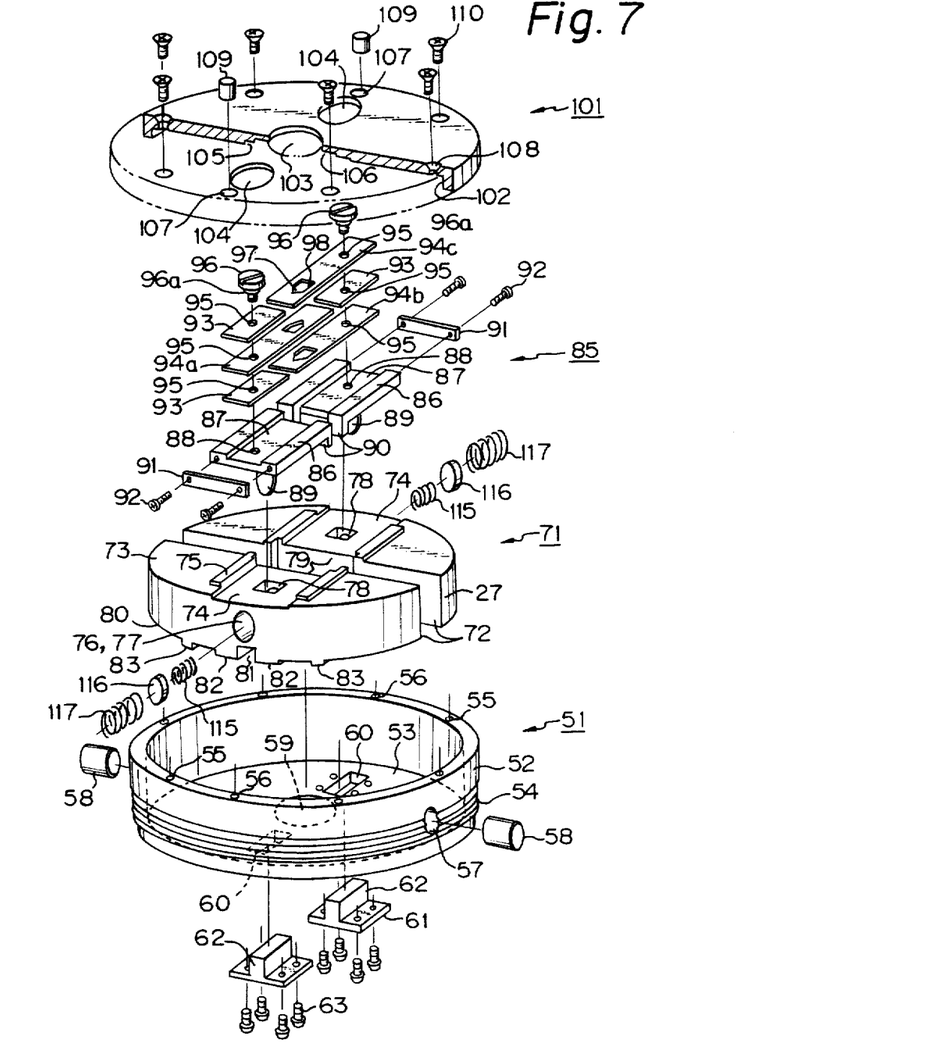
FIG. 7 is an exploded perspective view of a chucking device shown in FIG. 4.

Since the clamp plate 94a is located between and opposed to the clamp plates 94b and 94c, no rotational force which causes the ferrule to be inclined, that is, which causes the axis of the ferrule 5 to be inclined with respect to the axis of the centers 123 and 124 acts on the ferrule 5 and the ferrule can be held by a shearing force due to the clamp plates 94. This ensures a precise grinding of the ferrule. It is also possible to provide more than three clamp plates 94.

The workpiece, i.e., ferrule 5 can be held by the clamp plates 94 in the manner mentioned above. It should be noted here that only the return force of the compressed springs 115, the clamp plate supports 85 on which the centrifugal force acts, the clamp plates 94 on which the centrifugal force acts, and other elements integral with the clamp plate supports or the clamp plates contribute to the hold of the ferrule. The weight bodies per se on which the centrifugal force also acts do not contribute. The fact that the weight bodies do not contribute to the hold of the ferrule means that the ferrule, which is a small workpiece, can be properly held by an optimum holding force and that the ferrule can be protected from breakage or damage which otherwise would occur due to the large centrifugal force acting on the weight bodies, which are relatively heavy masses.

Furthermore, due to the arrangement in which the relatively thin clamp plates 94 are located in the recessed grooves 87 of the supports 85 between the inner recess 106 of the relatively thin end plate 101, the width of the entire thickness of the chucking device in the axial direction is very small. Accordingly, the ferrule can be held only in the very short length area thereof in the vicinity of the sharp front end of the stationary center 123 by means of the clamp plates, thus resulting in an increase in the length portion of the ferrule that can be ground.

Figure 8:
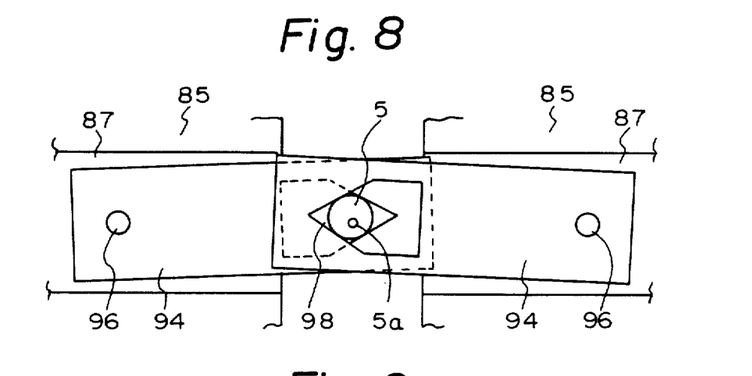
FIG. 8 is a partial front elevational view of clamp plates in an inclined state.

It will be easily understood that the resultant clamp force of the ferrule by the clamp plates increases as the acute angle of the diamond-shape opening 98 defined by the pair of triangles as shown in FIG. 8 decreases. Since the acute angles of the two apexes of the diamond-shape opening are identical to each other, an uniform and symmetric clamp force can be exerted on the ferrule by means of the clamp plates 94. If the ferrule has an eccentric bore 5a which is not coaxial to and deviated from the outer periphery of the ferrule, the clamp plates 94 rotate about respective pivots, i.e., the stepped screws 96, in accordance with the deviation or eccentricity, so that the clamp plates 94 are skewed as to clamp the outer periphery of the ferrule by the deformed diamond-shape opening 98, while the bore 5a of the ferrule is located on the center axis of the centers 123 and 124, as shown in FIG. 8. The angle formed by skewed clamp plates 94 depends upon the difference in width between the clamp plates and the recessed grooves 98 of the corresponding clamp plate supports 85. The largest angle of the clamp plates is limited to a value in which the ferrule can be inserted in the diamond-shape opening 98 so as to hold the ferrule between the opposed stationary centers 123 and 124, at the nonoperational position of the grinder mentioned above. The difference in width between the clamp plates and the recessed grooves 87 of the supports 85 is predetermined in view of the possible error range of the eccentricity or deviation of the axial bore 5a of the ferrule 5.

When the rotary spindle 121 stops rotating after grinding of the ferrule is finished by the grinding wheel 100 (FIG. 5), the centrifugal force extinguishes, so that the weight bodies 71 are returned to their initial positions, i.e., move close to each other in the radial and inward directions by means of the respective springs 117. This results in the outward and radial movement of the clamp plate supports 85, so that the supports come to their initial positions by means of the respective springs 115, so that the abutment projections 90 come into contact with the recesses 79 of the corresponding weight bodies 71. When the end faces 72 of the weight bodies 71 come into abutment against the respective pins 58, the diamond-shape opening 98 of the clamp plates 94 is enlarged, so that the ferrule is released from the clamp plates 94. The ferrule can be removed by the backward movement of the pusher (not shown) to move backward the stationary center 124.

Figure 9:
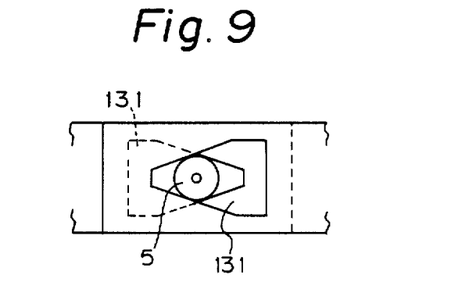
FIGS. 9 to 11 are front elevational views showing three variants of an opening of the clamp plates in which a workpiece to be ground is inserted.

The openings 98 of the clamp plates 94 are not limited to the pentagonal shape as mentioned above with reference to the illustrated embodiment. In an alternative, the triangles which define the acute apexes of the pentagonal-shape opening 98 in FIG. 8 are replaced by trapezoids, so that the openings are of irregular hexagonal shapes 131, as shown in FIG. 9. In this alternative in FIG. 9, there are no V-shaped sharp and long apexes, so easier machining of the openings 131 can be expected.

Figure 10:
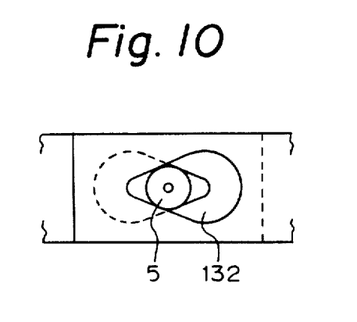

In an alternative shown in FIG. 10, the irregular hexagonal openings 131 of FIG. 9 are rounded at the angle corners thereof. In this modification of FIG. 10, because of the absence of angle corner portions of the hexagon, clamp plates having rounded openings 132 are substantially free from local stress which otherwise would occur at the angle corner portions.

Figure 11:
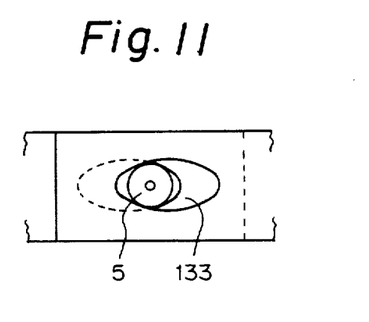

In another alternative shown in FIG. 11, the openings 133 are entirely rounded along the periphery thereof and are of a substantially elliptical shape.

In any event, the openings of the clamp plates are not limited to those mentioned and illustrated above. The workpiece, i.e., the ferrule, can be held substantially at two points each for the openings 98, etc., of the clamp plates 94 when viewed in a front elevational view (FIGS. 8, 9, 10, and 11), between a pair of converging two lines defining an acute contact angle. As mentioned before, the holding force, or clamping force, of the ferrule by the openings of the clamp plates increases as the contact angles of the opposed openings of the clamp plates decrease. However, preferably, the contact angles are larger than the angle of friction between the ferrule and the inner walls of the openings to ensure automatic separation of the ferrule from the inner walls of the openings 98, etc. When the clamp plates move in directions in which the opening defined by the two opposed openings 98, etc. is enlarged.

The manufacturing tolerance of the weight bodies and other components, such as clamp plate supports 85 and the clamp plates 94, is in the range of usual precision (e.g., 0.01 mm).

In the illustrated embodiments mentioned above, the spindle centers are stationary (nonrotatable), but they may be rotatable together with the spindle 121.

The workpiece is not limited to the ferrule and may be any piece to be ground.

Furthermore, in the present invention, the clamp plate supports 85 can be dispensed with. In such an alternative, the clamp plates 94 can be directly fitted into corresponding recessed grooves in the respective weight bodies 71.

As can be seen from the above discussion, the chucking device according to the present invention is simple in construction and cheap in manufacturing cost and can firmly hold the workpiece to be ground without damaging the same, following the outer contour of the workpiece, in a balanced manner, thus resulting in highly precise grinding.

We claim:

1. A chucking device of a workpiece to be ground in a grinding machine, comprising:
    a hollow housing, having guide means, which can be rotatably connected to the grinding machine;
    a pair of elastically biased weight bodies which are opposed in said hollow housing so as to come away from and close to each other along said guide means;
    a pair of clamp plate assemblies, each having a longitudinal axis, provided adjacent to said weight bodies and being slideably movable away from and towards each other along their longitudinal axis and having openings defining a center insertion opening in which the workpiece is inserted, said clamp plate assemblies further being angularly movable, from side to side, in a plane parallel to said weight bodies;
    support means, provided between said pair of clamp plate assemblies and said weight bodies, for supporting said pair of clamp plate assemblies; and
    an end plate which is secured to said hollow housing for covering said hollow housing in which said weight bodies and said clamp plate assemblies are accommodated, the workpiece being firmly held in and by said center insertion opening of said clamp plate assemblies at at least four points of said center insertion opening by the outward displacement of said weight bodies, due to a centrifugal force acting thereon when said chucking device rotates.

2. A chucking device according to claim 1, further comprising spring means for biasing said clamp plate assemblies to their initial positions.

3. A chucking device according to claim 1, further comprising spring means for biasing said weight bodies to their initial positions.

4. A chucking device according to claim 1, wherein said hollow housing comprises a bottomed cylindrical body.

5. A chucking device according to claim 4, wherein said guide means comprises key members provided on the bottom of said hollow housing and wherein said weight bodies comprise corresponding key ways in which said key members are slidably inserted.

6. A chucking device according to claim 1, wherein said weight bodies comprise substantially semicircular plates identical to each other which are spaced from and opposed to each other in said hollow housing.

7. A chucking device according to claim 1, further comprising abutment means in said hollow housing for engaging with said weight bodies, so that when said abutment means engages with said weight bodies, said weight bodies remain in their initial positions.

8. A chucking device according to claim 1, wherein said clamp plate assemblies are comprised of at least three clamp plates, one of which is opposed to and located between the other two clamp plates, so that the openings of said clamp plate assemblies are aligned on a same axial line to define said center insertion opening.

9. A chucking device of a workpiece to be ground in a grinding machine, comprising:
    a bottomed hollow cylindrical housing which has key members secured to the bottom and which has diametrically opposed pins provided on the periphery of the housing and projecting in the housing;
    a pair of semicircular plate-like weight bodies spaced from and opposed to each other in said housing, each of said weight bodies being provided, on its bottom, with a key way in which the corresponding key member of said housing is fitted for relative sliding movement, said weight bodies being provided, on their outer edge surfaces, with diametrically opposed stepped holes in which first and second springs are arranged, said weight bodies being provided, on their upper surfaces, with recesses;
    a pair of clamp plate supports which are fitted in the recesses of said weight bodies for radial relative movement, said clamp plate supports being provided, on their bottoms, with projections which are adapted to engage with said weight bodies to limit the radial and outward movement of said clamp plate supports, said clamp plate supports being provided, on their upper surfaces, with recesses extending in a diametrical direction;
    a pair of clamp plate assemblies including three identical clamp plates movably fitted in the corresponding recesses of said clamp plate supports, one of three plates being opposed to and spaced from the other two plates, said one clamp plate being located between the other two plates, said clamp plates having openings which define a center diamond-shape opening in which the workpiece can be inserted and held when said three clamp plates are superimposed one on another, and three identical spacer plates, one of which is located between said other two clamp plates, while said one clamp plate is located between the other two spacer plates, one assembly comprised of the two spacer plates and the one clamp plate therebetween and the other assembly composed of two clamp plates and the one spacer plate therebetween, each clamp plate assembly being connected to said clamp plate supports by means of respective screw pins, the recesses of said clamp plate supports having a width slightly larger than a width of said clamp plates, so that said clamp plates can rotate about the respective screw pins, said first springs continuously biasing said clamp plate supports in radial and outward directions, said second springs continuously biasing said weight bodies in radial and inward directions; and an end plate which is secured to said bottomed hollow cylindrical housing to cover said housing, said weight bodies and said clamp plate assembly being accommodated therein.

10. A chucking device of a workpiece to be ground in a grinding machine, comprising:

a hollow housing, having guide means, which can be rotatably connected to the grinding machine;

a pair of elastically biased weight bodies which are opposed in said hollow housing so as to come away from and close to each other along said guide means;

a pair of clamp plate assemblies, each having a longitudinal axis, provided adjacent to said weight bodies and being slideably movable away from and towards each other along their longitudinal axis and ahving openings defining a center insertion opening in which the workpiece is inserted, said clamp plate assemblies further being angularly movable, from side to side in a plane parallel to said weight bodies;

support means provided between said pair of clamp plate assemblies and said weight bodies for supporting said pair of clamp plate assemblies; and abutment means in said hollow housing for engaging with said weight bodies and comprising a pair of diametrically opposed pins which project in the housing and with which the weight bodies come into contact, so that when said abutment means engages with said weight bodies, said weight bodies remain in their initial positions; and an end plate which is secured to said hollow housing for covering said hollow housing in which said weight bodies and said clamp plate assemblies are accommodated, the workpiece being firmly held in and by said center insertion opening of said clamp plate assemblies at at least four points of said center insertion opening by the outward displacement of said weight bodies, due to a centrifugal force acting thereon when said chucking device rotates.

11. A chucking device of a workpiece to be ground in a grinding machine, comprising:

a hollow housing, having guide means, which can be rotatably connected to the grinding machine;

a pair of elastically biased weight bodies which are opposed in said hollow housing so as to come away from and close to each other along said guide means;

a pair of clamp plate assemblies, each having a longitudinal axis, which are provided adjacent to said weight bodies and being slideably movable away from and toward each other along their longitudinal axis and which have openings defining a center insertion opening in which the workpiece is inserted, said clamp plate assemblies further being angularly movable, from side to side, in a plane parallel to said weight bodies;

means provided between said pair of clamp plate assemblies and said weight bodies for supporting said pair of clamp plate assemblies and comprising a pair of diametrically opposed support plates located on said weight bodies; and an end plate which is secured to said hollow housing for covering said hollow housing in which said weight bodies and said clamp plate assemblies are accommodated, the workpiece being firmly held in and by said center insertion opening of said clamp plate assemblies at at least four points of said center insertion opening by the outward displacement of said weight bodies, due to a centrifugal force acting thereon when said chucking device rotates.

12. a chucking device according to claim 11, further comprising recessed grooves on the weight bodies for receiving the support plates.

13. a chucking device according to claim 11, wherein said support plates are provided with recesses for receiving the corresponding clamp plates.

14. A chucking device according to claim 13, wherein said recesses of the support plates have a width slightly larger than a width of the corresponding clamp plates, so that the clamp plates can be movable in the recesses of the support plates.

15. A chucking device according to claim 14, further comprising pin means for rotatably connecting the clamp plates to the corresponding support plates, so that the clamp plates can rotate in the recesses of the corresponding weight bodies about the pin means.

* * * * *

UNITED STATES PATENT AND TRADEMARK OFFICE
CERTIFICATE OF CORRECTION

PATENT NO. : 4,709,512

DATED : December 1, 1987

INVENTOR(S) : Okubo et al.

It is certified that error appears in the above-identified patent and that said Letters Patent is hereby corrected as shown below:

Col. 11, line 31, "ahving" should be --having--;

line 34, "side" (second occurrence) should be --side,--.

Col. 12, line 35, "a" should be --A--;

line 38, "a" should be --A--.

Signed and Sealed this

Twenty-first Day of June, 1988

Attest:

DONALD J. QUIGG

Attesting Officer

Commissioner of Patents and Trademarks